United States Patent [19]

Sloan et al.

[11] Patent Number: 4,488,479
[45] Date of Patent: Dec. 18, 1984

[54] PORTABLE APPARATUS FOR COOKING EGGS ON A HEATED COOKING SURFACE

[75] Inventors: Norman R. Sloan, New Lenox; Dionizas Remys, Clarendon Hills; Robert A. Novy, LaGrange Park, all of Ill.

[73] Assignee: Restaurant Technology, Inc., Oak Brook, Ill.

[21] Appl. No.: 576,573

[22] Filed: Feb. 3, 1984

[51] Int. Cl.³ .......................................... A47J 29/00
[52] U.S. Cl. ...................................... 99/345; 99/352; 99/422; 99/426; 99/448; 99/467; 126/380; 426/510; 426/614
[58] Field of Search ................. 99/330, 339, 345, 347, 99/352, 422, 425, 426, 428, 440, 467, 474, 448; 219/401; 126/20, 369, 380; 426/510, 511, 523, 614

[56] References Cited

U.S. PATENT DOCUMENTS

| | | |
|---|---|---|
| D. 162,041 | 2/1951 | Klein . |
| 2,481,711 | 9/1949 | Bemis et al. . |
| 2,824,510 | 2/1958 | Gangwer . |
| 3,704,663 | 12/1972 | Shull et al. . |
| 4,345,516 | 8/1982 | Sinclair . |
| 4,358,992 | 11/1982 | Behnisch ............................ 99/345 |

FOREIGN PATENT DOCUMENTS

| | | | |
|---|---|---|---|
| 225741 | 9/1910 | Fed. Rep. of Germany | 99/428 |
| 2326888 | 11/1973 | Fed. Rep. of Germany | 99/345 |
| 1287075 | 8/1972 | United Kingdom | 99/345 |
| 707557 | 1/1980 | U.S.S.R. | 99/352 |

OTHER PUBLICATIONS

Prince Castle, Inc. "#122-6 Pak Egg Ring Instruction Sheet", dated 10/13/76.

Primary Examiner—Billy J. Wilhite
Attorney, Agent, or Firm—Dressler, Goldsmith, Shore, Sutker & Milnamow Ltd.

[57] ABSTRACT

A portable apparatus is provided for cooking eggs on a heated cooking surface or grill and includes a frame with a plurality of rings carried on the frame. Each ring is adapted to be disposed on the grill and to receive a shelled egg therein. A peripheral wall means is provided for enclosing the rings. A removable closure assembly is provided for being positioned over the rings and includes (1) a cover at least coextensive with the peripheral wall means and adapted to engage the peripheral wall means, (2) an open top container mounted on the cover and defining a reservoir for receiving a predetermined quantity of water therein, and (3) means for defining an unobstructed orifice through the cover and communicating with the interior of the container for metering the water at a predetermined rate onto the grill. The relationship between the rings, the peripheral wall means, and the closure assembly is effective to (1) locate the orifice means to meter the water onto an area of the grill within the peripheral wall means but exterior of all of the rings, (2) provide space between the top of each ring and the cover to permit steam generated from the water metered onto the grill to flow into the interior of the rings, and (3) define an enclosed containment volume within the peripheral wall means and cover for retaining the steam therein.

9 Claims, 4 Drawing Figures

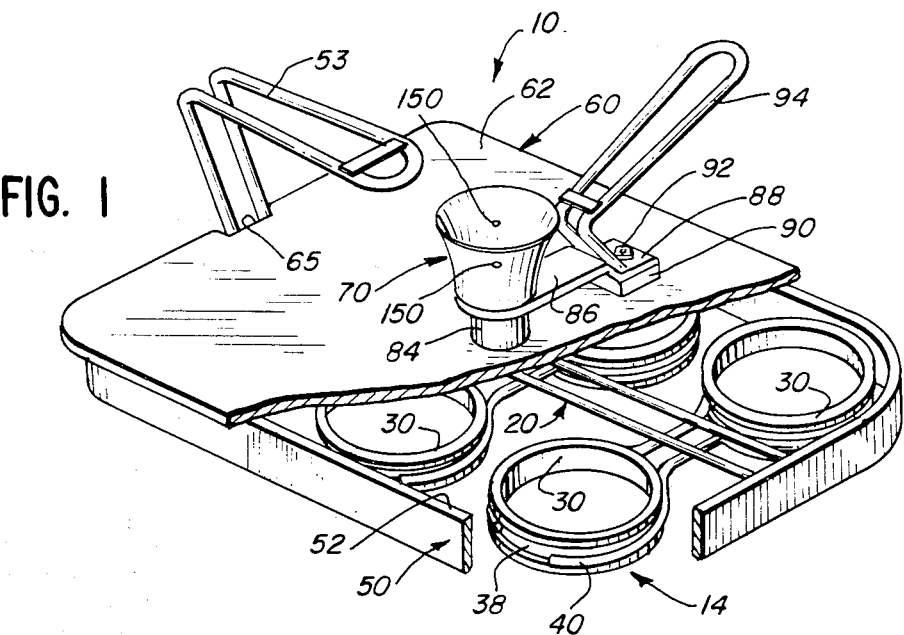
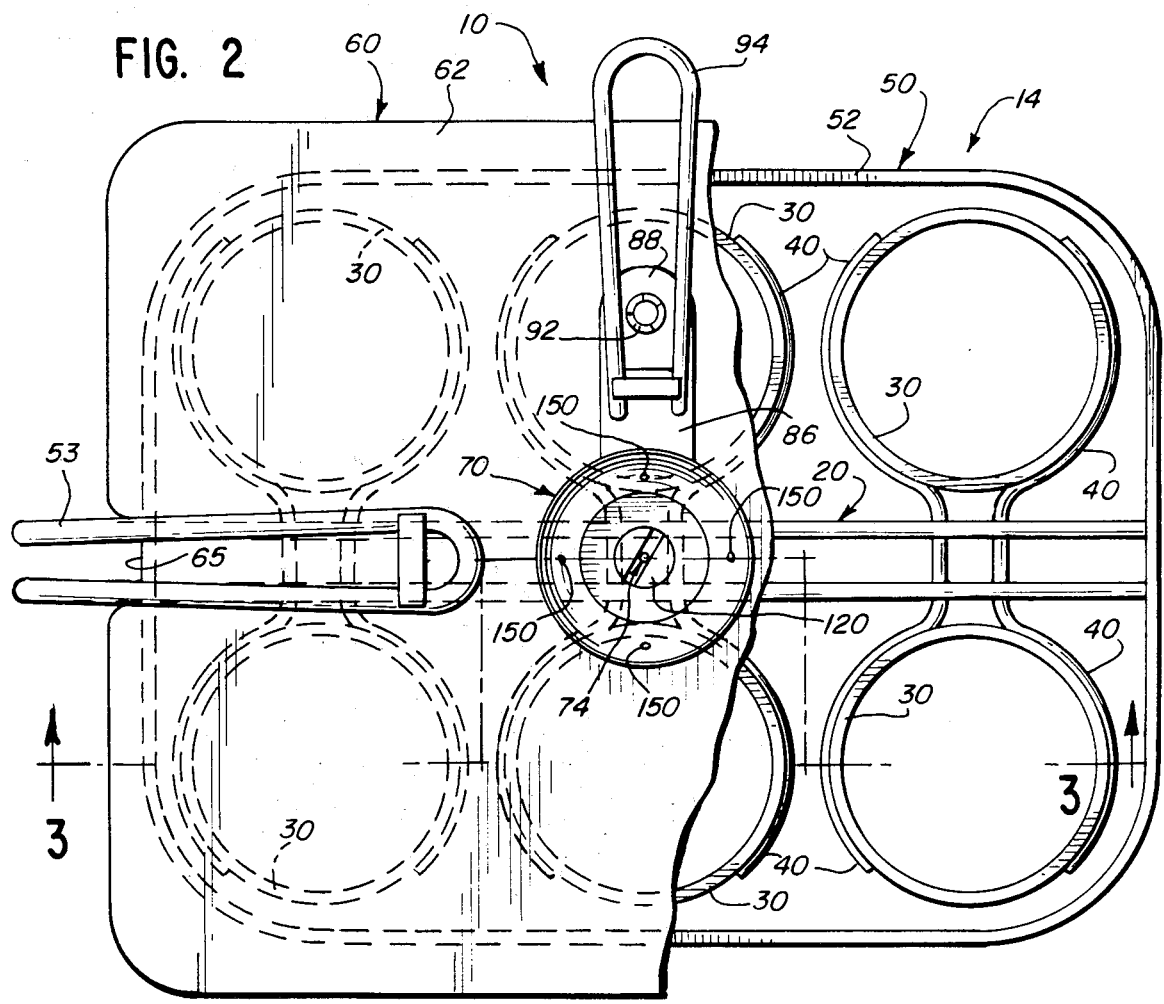

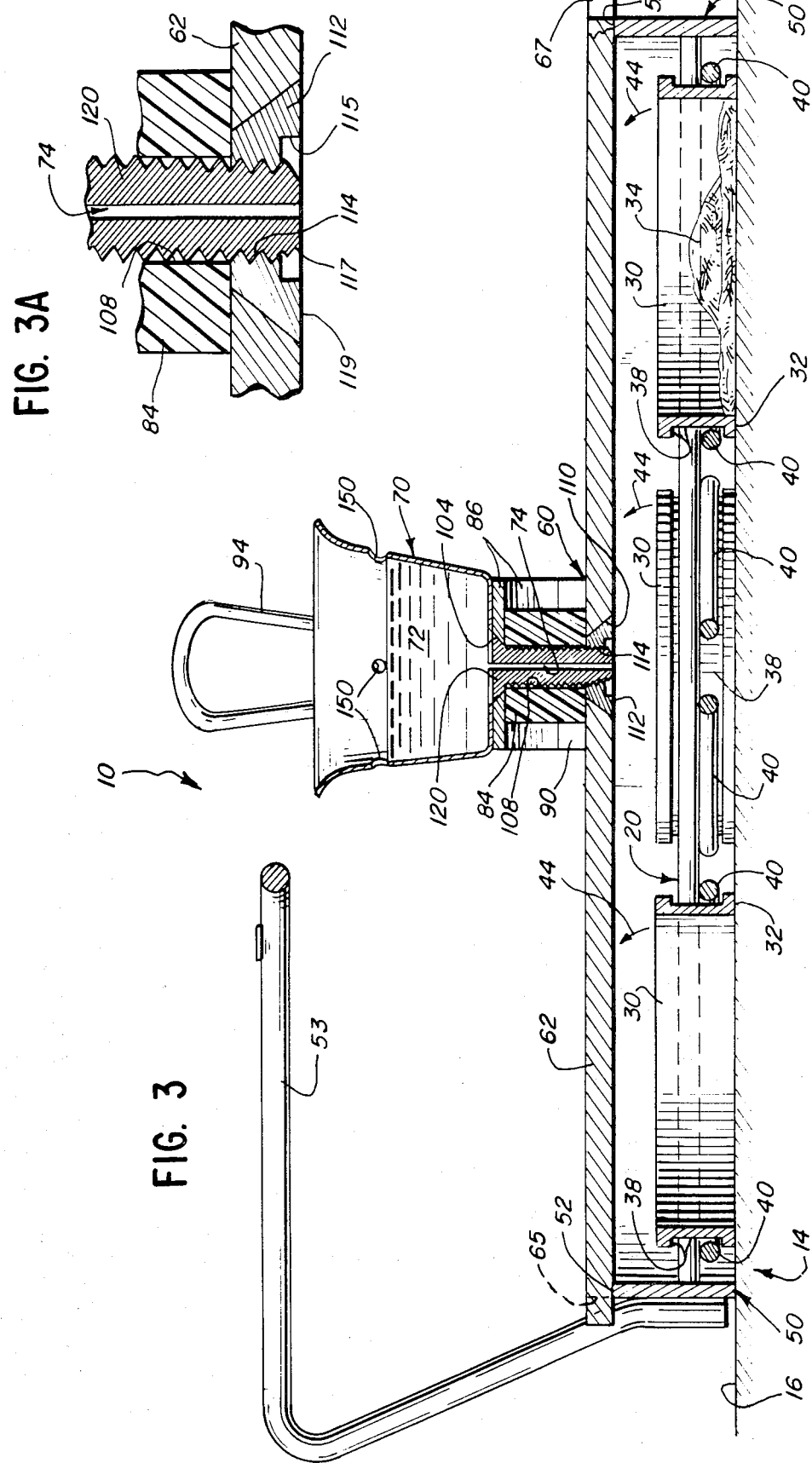

4,488,479

PORTABLE APPARATUS FOR COOKING EGGS ON A HEATED COOKING SURFACE

TECHNICAL FIELD

This invention relates to cooking, and specifically to equipment for cooking one or more shelled eggs.

BACKGROUND OF THE INVENTION

Various processes and apparatus have been used to mix, treat, fry, poach, and baste eggs. The characteristics of the resulting egg product vary with the particular process employed and with the specific apparatus that is used for carrying out the process.

In the home and in restaurants, especially in fast food restaurants, it would be desirable to have an apparatus for cooking eggs whereby at least the bottom portion of each egg is grilled or fried with an upper portion of each egg being simultaneously basted with steam. It would be especially desirable to provide such an apparatus with the capability for cooking one or a plurality of eggs in individual servings for one or more persons.

It would also be advantageous if such an apparatus were portable, were unencumbered by electrical or steam connections, and were easily operated in conjunction with an existing grill or griddle.

Further, it would be beneficial if such an apparatus, when used on a cooking surface maintained at a selected temperature, included means for providing a controlled amount of steam for basting the eggs.

Finally, it would be advantageous if such an apparatus were easy to use, clean, and store.

SUMMARY OF THE INVENTION

A preferred embodiment of the apparatus as disclosed in detail herein is adapted to be used for cooking eggs on a heated cooking surface, such as a grill or the like. The apparatus includes a portable frame and a plurality of rings carried by the frame for being disposed on the cooking surface. A peripheral wall means is provided for being disposed on the cooking surface to enclose the rings.

A removable closure assembly is provided to be positioned over the frame, rings, and peripheral wall means. The closure assembly includes (1) a cover at least coextensive with the peripheral wall means and adapted to engage the peripheral wall means, (2) an open top container mounted on the cover and defining a reservoir for receiving a predetermined quantity of water therein, and (3) means for defining an unobstructed orifice through the cover and communicating with the interior of the container for metering the water at a predetermined rate onto the cooking surface.

The relationship between the rings, the peripheral wall means, and the closure assembly is effective to (1) locate the orifice means to meter the water onto an area of the cooking surface within the peripheral wall means but exterior of all of the rings, (2) provide space between the top of each ring and the cover to permit steam generated from the water metered onto the cooking surface to flow into the interior of the rings, and (3) define an enclosed containment volume within the peripheral wall means and cover above the cooking surface for retaining the steam therein.

Numerous advantages and features of the present invention will become readily apparent from the following detailed description of the invention and of a preferred embodiment thereof, from the claims, and from the drawings.

BRIEF DESCRIPTION OF THE DRAWINGS

In the accompanying drawings forming part of the specification and in which like numerals are employed to designate like parts throughout the same, FIG. 1 is a perspective view of the apparatus disclosed herein for cooking eggs with a portion of the apparatus cut away to better illustrate interior detail;

FIG. 2 is an enlarged plan view of the apparatus with a portion of the apparatus cut away to better illustrate interior detail;

FIG. 3 is an even more enlarged, cross-sectional view taken generally along the planes 3—3 in FIG. 2; and FIG. 3A is an enlarged fragmentary view of a portion of FIG. 3.

DESCRIPTION OF THE PREFERRED EMBODIMENT

While this invention is susceptible of embodiment in many different forms, there is shown in the drawings and is herein described in detail a preferred embodiment. It should be understood, however, that the present disclosure is to be considered as an exemplification of the principles of the invention and is not intended to limit the invention to the embodiment illustrated.

The precise shapes and sizes of the components herein described are not essential to the invention unless otherwise indicated.

A preferred embodiment of the apparatus for cooking eggs is illustrated in FIG. 1 and is designated therein generally by reference numeral 10. The illustrated preferred embodiment of the apparatus 10 would typically be placed on a conventional heated grill, such as is usually found in a restaurant or institutional kitchen, and would be used for preparing from one to six cooked eggs. However, the apparatus 10 may also be used with other heated cooking surfaces, such as a flat griddle on a heated range in a home kitchen or restaurant.

The apparatus includes a portable base assembly 14 for being disposed on the surface 16 (FIG. 3) of a grill or griddle. The base assembly 14 includes a frame 20 which carries a plurality of rings 30 that each have a bottom surface 32 (FIG. 3) for being disposed on the grill surface 16. The precise manner in which the rings 30 are carried by the frame 20 is described in detail hereinafter. Each ring 30 is adapted to receive therein a shelled egg 34 (FIG. 3 only). In the preferred embodiment, each ring 30 is fabricated from a powdered metal iron base and has a conventional black polytetrafluoroethylene dispersion coating.

The portable apparatus 10 also includes peripheral wall means 50 for being disposed on the heated grill surface 16 to enclose the rings 30. In the preferred embodiment illustrated, the peripheral wall means 50 is connected to the frame 20 as an integral part of the base assembly 14 and defines an upper edge 52.

Preferably, the peripheral wall means 50 is a wall which, in plan view, defines the outlne of a rectangle or square with arcuate corners. It may be fabricated from nickle-plated steel and preferably includes a handle 53 which may be fabricated from cold rolled steel wire. The frame 20 may be fabricated from a bright basic wire and may be welded or otherwise secured to the peripheral wall means 50

As best illustrated in FIG. 3, each ring 30 preferably has a circumferential groove 38 for receiving arcuate holding prongs or members 40 which constitute part of the frame 20. The arcuate holding members 40 are loosely received in the ring grooves 38. When the assembly 14 is disposed on the grill surface 16 as illustrated in FIG. 3, the members 40 are positioned to "float" within the grooves 38 with at least a small amount of vertical clearance relative to the lower portion of each groove. This ensures that the assembly peripheral wall 50 will be properly seated on the grill surface 16. However, when the base assembly 14 is lifted up off of the grill surface 16, the arcuate holding members 40 will move upwardly along the ring grooves 38 to engage the upper side edges of the ring grooves 38.

The loose fitting arrangement of the rings 30 within the arcuate holding members 40 also permits removal of the rings 30 for cleaning. Specifically, with reference to FIG. 3, a ring 30 may be tilted in the direction of arrow 44 relative to the arcuate holding members 40. Since each pair of arcuate holding members 40 extends only partially around each ring 30 and are not connected, the members 40 have sufficient flexibility to permit removal and reinstallation of the rings 30.

The apparatus 10 also includes a removable closure assembly 60 which is adapted to be positoned over the base assembly 14. The closure assembly 60 includes a cover 62 which is at least coextensive with the peripheral wall means 50 and which is adapted to engage the peripheral wall means 50. In the preferred embodiment illustrated, the cover 62 is adapted to be seated on the upper edge 52 of the peripheral wall means 50. However, it is to be realized that, in other forms of the invention, the peripheral wall means 50 may be fabricated as an integral part of the cover 62 or may be fabricated as a piece entirely separate from, and not connected with, either the frame 20 or the cover 62.

The cover 62 is also provided with two notches 65 (FIGS. 1–3) and 67 (FIG. 3 only). Each notch 65 and 67 is designed to receive a portion of the handle 53 extending from the wall means 50. This helps to locate the cover 62 properly over the wall means 50 and rings 30. The cover 62 may be oriented so that the handle 53 is received in either notch at the convenience of the user.

The removable closure assembly 60 further includes an open top container 70 mounted on the cover 62 and defining a reservoir for receiving therein a predetermined quantity of water 72 (FIG. 3 only).

The removable closure assembly 60 also includes means 74 for defining an unobstructed orifice through the cover 62 and communicating with the interior of the container 70 for metering the water 72 at a predetermined rate onto the surface 16 of the grill. The details of this orifice construction in the preferred embodiment are described hereinafter.

Regardless of whether or not the peripheral wall means 50 is free standing, connected to the frame 20, or connected to the cover 62, there is a specific relationship between the rings 30, the peripheral wall means 50, and the closure assembly 60. This relationship is effective to (1) locate the orifice means 74 to meter the water 72 onto an area of the surface 16 of the grill within the peripheral wall means 50 but exterior of all of the rings 30, (2) provide space between the top of each ring 30 and the cover 62 to permit steam generated from the water 72 metered onto the grill surface 16 to flow into the interior of the rings 30, and (3) define an enclosed containment volume within the peripheral means 50 and cover 62 above the grill surface 16 for retaining the steam therein.

In the illustrated preferred embodiment, the cover 62 is preferably fabricated from anodized aluminum plate. a bushing 84, which may be phenolic, is disposed on the cover 62 below the container 70. This functions as a thermal barrier. A support member 86 is disposed between the bottom of the container 70 and the top of the bushing 84. The bottom of the container 70 is welded or otherwise secured to the support member 86.

The support member 86 has an outwardly extending offset portion 88 (FIGS. 1 and 2) which is spaced above the cover 62 by a spacer bushing 90 and which is secured to the cover 62 with a suitable threaded fastener, such as a bolt 92. A handle 94, which is preferably fabricated from stainless steel wire, is welded or otherwise suitably secured to the support member 86.

With reference to FIGS. 3 and 3A, the illustrated preferred embodiment further includes a frustoconical aperture 102 defined in the bottom of the container 70 and a frustoconical aperture 104 defined in the support member 86 below the container aperture 102. Further, the bushing 84 defines a bore 108 aligned with the support member aperture 104 and with the container aperture 102. The cover 62 defines a frustoconical aperture 110 aligned with the bushing bore 108. The closure assembly 60 further includes a frustoconical insert 112 matingly disposed within the cover frustoconical aperture 110 and defining a threaded bore 114 aligned with the bushing bore 108.

A screw 120 is positioned with the screw head in the support member aperture 104 to engage the support member 86. The shank or body of the screw 120 is positioned within the bushing bore 108 and insert bore 114. The end of the shank of the screw 120 is threadingly engaged with the insert 112. The screw 120 has a bore extending from one end of the screw to the other end, and the screw 120 thus functions with this bore as a means for defining the unobstructed orifice 74 within the support member aperture 86, within the bushing bore 108, and within the insert member bore 114.

Desirably, bore 114 may be provided with a counterbore 115, as best seen in FIG. 3A, and the end of the screw 120 is provided with a chamfer 117. If the screw 120 is about ¼ of an inch (6.4 mm.) in outside diameter, then the counterbore 115 may have a diameter of about 7/16 of an inch (11.1 mm.) and a depth of about 3/32 of an inch (2.4 mm.), thereby to provide a space between the end of the screw and the insert face 119 to minimize the possiblity that water passing through orifice 74 will spread along the underside of the cover 62 rather than drop straight down. This lip structure is helpful to the effective functioning of the apparatus of this invention.

In a preferred embodiment, the bore in the screw 120 defining the unobstructed orifice means 74 has a diameter of about 1/16 of an inch (1.6 mm.), and the container 70 is designed to hold about one and one-half ounces (44.4 ml.) of water at an initial static head of about 1 inch (25.4 mm.). With such a design, the water is dispensed from the reservoir of the container 70 over a time period of between about 30 seconds and about 45 seconds. At such a flow rate, the water is introduced onto the grill surface 16 slowly enough so that there are substantially no bubbles or liquid drops ("dancing around" on the the grill surface when the grill surface is maintained at a temperature of about 265° F. (130° C.).

Preferably, the container 70 also defines indicia means, such as apertures 150, for indicating when a predetermined quantity of water 72 has been disposed in the container 70. In the preferred embodiment illustrated, there are four apertures 150 defined in the container 70 at a predetermined elevation above the container bottom. These apertures 150 permit flow of water through the apertures 150 and out of the container 70 when the water level in the container is higher than the predetermined elevation. In the embodiment illustrated, each overflow aperture 150 is a circular hole. Preferably, the apertures 150 may be as much as about ¼ inch (6.4 mm.) in diameter to minimize "overfilling".

The novel apparatus of the present invention can be made relatively small so as to take up a relatively little storage space. Further, the novel apparatus does not require any electrical connections or conduit connections for water, steam, pressurized air, or other fluids. Accordingly, the apparatus is portable and can be used in almost any cooking facility wherein there is a flat grill surface or wherein there is a flat pan or griddle or sufficient size to accommodate the apparatus.

In operation, the apparatus 10 cooks eggs relatively quickly. Specifically, when eggs are to be cooked with the apparatus 10, the grill surface 16 is preferably initially buttered or coated with a suitable cooking oil. Preferably, the grill surface is maintained at less than 300° F. (149° C.) and is preferably maintained at about 265° F. (130° C.). However, greater or lesser temperatures may be employed depending on the degree of cooking desired and depending upon, inter alia, the heat transfer characteristics of the particular materials used in the apparatus construction, the size of the apparatus, the amount of water to be used as described below, etc.

The frame 20 is placed on the hot grill surface 16 so that each of the rings 30 is in contact with the grill surface 16. The cover assembly 60 is not yet disposed over the rings 30.

Next, one shelled egg is typically placed in each of the rings 30. However, not all of the rings 30 need be used. Preferably, the yolk of the shelled egg each ring 30 is broken, as by briefly stirring the shelled egg with a suitable instrument, such as a small spatula or fork.

Then the closure assembly 60 is placed over the rings 30. Specifically, the closure assembly 60 is seated on the upper edge 52 of the peripheral wall means 50 to define an enclosed containment volume within the peripheral wall means 50 and cover 62 above the grill surface 16.

Next, the container 70 above the cover 62 is filled with water to the elevation of the overflow apertures 150. The water begins dripping through the unobstructed orifice defining means 74 onto the grill between the rings 30. If too much water is accidentally added to the container 70, the excess water will flow out of the overflow apertures 150 onto the top of the cover 62 and eventually evaporate.

The water dropping onto the grill is evaporated into steam and flows throughout the space defined by the cover 62, wall means 50, and grill surface 16. The steam bastes the top surfaces of the eggs while the eggs are grilled on the bottoms and sides by means of direct heat transfer from the grill surface 16 and from the rings 30.

The total cooking time, including the time period before the cover assembly 60 is disposed over the rings 30, depends upon, inter alia, the heat transfer characteristics of the particular materials used in the apparatus construction, whether or not the empty rings are preheated to substantially the same temperature as the grill surface, the size of the entire apparatus 10, the specific temperature of the grill surface 16, and the volume of water in the container 70 below the overflow apertures 150. Also of course, the length of time that the eggs are cooked depends upon what degree of cooking is desired (e.g., whether it is desired to produce cooked eggs with a slightly "soft" consistency or with a slightly "hard" consistency). Typically, the apparatus 10 would be used to cook the eggs so that the interior portion of each egg reaches a temperature of about 165° F. (74° C.).

The apparatus 10 of this invention is well suited for use with a heated grill that can be automatically controlled to a selected temperature. When used with such a grill controlled to a temperature of about 265° F. (130° C.), the apparatus 10 produces a cooked egg product with virtually no scorching. Eggs can be consistently cooked with the apparatus 10 to the same uniform quality.

When the eggs have been cooked to the desired degree, the cover assembly 60 is lifted away from the rings 30. Next, the base assembly 14 is lifted away from the grill surface 16 to expose the cooked eggs on the grill surface 16. If necessary, the assembly 14 may be vibrated laterally and/or vertically a small amount for one or two seconds to loosen any eggs that may stick to the rings 30 and to ensure that the eggs remain on the grill surface 16. The cooked eggs may then be removed with a spatula.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course intended to cover by the appended claims all such modifications as fall within the scope of the claims.

What is claimed is:

1. A portable apparatus for cooking eggs on a heated grill, said apparatus comprising:
    (a) a portable base assembly for being disposed on said grill, said base assembly including (1) a peripheral wall for being disposed on said grill and having an upper edge, (2) a plurality of rings for being disposed on said grill and that are each adapted to receive a shelled egg therein, and (3) frame means for carrying said rings within said peripheral wall;
    (b) a removable closure assembly adapted to be received on said base assembly, said closure assembly including (1) a cover at least coextensive with said peripheral wall and adapted to be seated on said upper edge, (2) an open top container mounted on said cover and defining a reservoir for receiving a predetermined quantity of water therein, and (3) means for defining an unobstructed orifice through said cover and communicating with the interior of said container for metering said water at a predetermined rate onto said grill; and
    (c) the relationship between said base assembly and said closure assembly being effective to (1) locate said orifice means to meter said water onto an area of said grill within said peripheral wall but exterior of all of said rings, (2) provide space between the top of each said ring and said cover to permit steam generated from said water metered onto said grill to flow into the interior of said rings, and (3) define an enclosed containment volume within said peripheral wall and cover above said grill for retaining the steam therein.

2. A portable apparatus for cooking eggs on a heated cooking surface, such as a grill or the like, said apparatus comprising:
   (a) a portable frame;
   (b) a plurality of rings carried by said frame for being disposed on said cooking surface;
   (c) peripheral wall means for being disposed on said cooking surface to enclose said rings;
   (d) a removable closure assembly adapted to be positioned over said frame, rings, and peripheral wall means, said closure assembly including (1) a cover at least coextensive with said peripheral wall means and adapted to engage said peripheral wall means, (2) an open top container mounted on said cover and defining a reservoir for receiving a predetermined quantity of water therein, and (3) means for defining an unobstructed orifice through said cover and communicating with the interior of said container for metering said water at a predetermined rate onto said cooking surface; and
   (e) the relationship between said rings, said peripheral wall means, and said closure assembly being effective to (1) locate said orifice means to meter said water onto an area of said cooking surface within said peripheral wall means but exterior of all of said rings, (2) provide space between the top of each said ring and said cover to permit steam generated from said water metered onto said cooking surface to flow into the interior of said rings, and (3) define an enclosed containment volume within said peripheral wall means and cover above said cooking surface for retaining the steam therein.

3. The apparatus in accordance with claim 2 in which said peripheral wall means is connected to said frame to form an integral base assembly; in which said peripheral wall means has an upper edge; and in which said closure assembly is adapted to be seated on said upper edge of said peripheral wall means.

4. The apparatus in accordance with claim 2 wherein said container defines indicia means for indicating when a predetermined quantity of water has been disposed therein.

5. The apparatus in accordance with claim 4 in which said indicia means includes at least one aperture defined in said container at a predetermined elevation above said container bottom to permit flow of water through said aperture and out of said container when the water in said container exceeds said predetermined elevation.

6. The apparatus in accordance with claim 2 in which said closure assembly includes a support member between said cover and said container, in which the bottom of said container is joined to said support member, in which said support member defines an aperture, in which the bottom of said container defines an aperture in communication with said support member aperture, and in which said means for defining an unobstructed orifice includes means for defining part of said unobstructed orifice within said support member aperture to communicate with said container bottom aperture.

7. The apparatus in accordance with claim 6 in which said closure assembly further includes a bushing that is located between said cover and said support member and that defines a bore aligned with said support member aperture; in which said cover defines a frustoconical aperture aligned with said bushing bore; in which said closure assembly further includes a frustoconical insert matingly disposed within said cover frostoconical aperture and defining a threaded bore aligned with said bushing bore; in which said closure assembly further includes a screw with the screw head being positioned in said support member aperture to engage said support member and with the shank of said screw being (1) positioned within the bores of both said bushing and insert and (2) threadingly engaged with said insert; and in which said screw defines a bore from one end of the screw to the other end for functioning as said unobstructed orifice defining means.

8. The apparatus in accordance with claim 2 in which said peripheral wall means is connected to said frame to form an integral base assembly; in which said apparatus further includes a handle extending from said peripheral wall means; and in which said cover defines at least one notch for receiving a portion of said handle.

9. The apparatus in accordance with claim 2 in which space is provided around a portion of said unobstructed orifice defining means adjacent the underside of said cover to minimize the possibility that water passing through said orifice will spread along the underside of said cover.

* * * * *